United States Patent [19]

Vincent et al.

[11] Patent Number: 4,929,376

[45] Date of Patent: May 29, 1990

[54] QUATERNARY AMMONIUM SALT OF AN ALKOXYSILANE AS A DISPERSANT FOR MAGNETIC PIGMENT

[75] Inventors: Gary A. Vincent; Judith M. Sylvester; Harold L. Vincent, all of Midland, Mich.

[73] Assignee: Dow Corning Corporation, Midland, Mich.

[21] Appl. No.: 171,613

[22] Filed: Mar. 23, 1988

[51] Int. Cl.$^5$ .............................................. C04B 35/26
[52] U.S. Cl. ................................................. 252/62.56
[58] Field of Search ................. 252/62.56, 357, 62.54; 106/460; 148/105, 307

[56] References Cited

U.S. PATENT DOCUMENTS

| | | | |
|---|---|---|---|
| 3,471,541 | 10/1969 | Morehouse | 260/438.1 |
| 4,076,890 | 2/1978 | Yamada et al. | 428/337 |
| 4,271,234 | 6/1981 | Schonafinger et al. | 428/405 |
| 4,590,127 | 5/1986 | Hashimoto et al. | 428/405 |
| 4,597,801 | 7/1986 | Stratta et al. | 106/308 |
| 4,732,706 | 3/1988 | Borduz et al. | 252/510 |
| 4,740,423 | 4/1988 | Kadokura et al. | 428/403 |
| 4,762,568 | 8/1988 | Nakamura et al. | 106/403 |
| 4,772,522 | 9/1988 | Kubota et al. | 428/328 |

*Primary Examiner*—John Doll
*Assistant Examiner*—Stephen G. Kalinchak
*Attorney, Agent, or Firm*—Alexander Weitz

[57] ABSTRACT

There is disclosed the use of a quaternary ammonium salt of an alkoxysilane as a dispersant for magnetic pigment particles in the preparation of magnetic recording media. The dispersant of the present invention can bind to the pigment particles and may be substituted for conventional phosphate ester dispersants which are incapable of binding to the pigment and tend to migrate to the surface of such media, thereby adversely affecting recording media performance.

1 Claim, No Drawings

QUATERNARY AMMONIUM SALT OF AN ALKOXYSILANE AS A DISPERSANT FOR MAGNETIC PIGMENT

This invention relates to magnetic recording media. More particularly, this invention relates to a composition comprising a quaternary ammonium salt of an alkoxysilane dispersant and magnetic pigment particles. The composition may be formulated into a magnetic coating composition which, in turn, is used to produce magnetic media having excellent magnetic properties.

BACKGROUND OF THE INVENTION

Magnetic media conventionally comprise a magnetic coating on a non-magnetic substrate (support). The magnetic coating, which is generally applied as a suspension in an organic solvent and is subsequently dried, is basically made up of fine magnetic pigment particles, such as iron oxide, dispersed in a polymeric resin binder, but may also contain lubricants and other additives. For many applications, such as video tape, computer tape, audio tape, floppy disks and rigid disks, the magnetic propertiess of the magnetic coating must be optimized in order to take advantage of the increased sophistication and capabilities of modern recording and computer hardware. Thus, for example, squareness ratio (SR) should be as high as possible, coercivity (Hc) should be high and switching field distribution (SFD) should be kept low. These properties are readily calculated from a magnetization curve. Squareness ratio is equal to the quotient of retained magnetic flux divided by maximum magnetic flux and high values indicate greater retention of information stored in the magnetic media. Coercivity is a measure of the difficulty of erasing a recorded signal and high values result in improved "protection" of stored information. Switching field distribution is a measure of the variation in particle coercivity in a magnetic medium. A small SFD gives a well defined recording zone and increased output at short wavelengths. Of these variables, the squareness ratio is most important; it represents the effectiveness of the dispersion of magnetic particles, and high values result in increases long wavelength output of the magnetic medium.

Superior magnetic properties can, however, only be attained when the magnetic pigment is well dispersed in the medium, such that the individual maygnetic particles do not interfere with each other. Unfortunately, the magnetic pigments, which are of microscopic dimensions, are highly agglomerated and therefore difficult to disperse. Once dispersed in magnetic media, they have a strong tendency to re-agglomerate within a short period of time. This difficulty has been resolved in the art to some degree by including a dispersant in the magnetic coating composition.

Early formulations employed small quantities of the natural product lecithin, or a phosphate ester, as the dspersant. Use of a phosphate ester dispersant to achieve good dispersion, improved durability and reduced discontinuities is claimed in U.S. Pat. No. 4,419,257 to Frew et al. Therein, the phosphate ester is combined with a solvent system which includes a dibasic ester and has specific Hansen three-dimensional solubility parameter values. Such dispersants do improve the dispersion quality in a magnetic coating composition, but they can not chemically bind to the pigment particles, and so are free to migrate within the magnetic coating composition, even when the latter is dried onto a substrate to form the magnetic medium. This free dispersant tends to plasticize (i.e., soften) the polymeric binder as well as migrate to the surface of a finished magnetic medium where it can, for example, mix with lubricant and thereby adversely affect frictional properties. Once at the surface of a magnetic medium, the dispersant can potentially oxidize, pick up debris or deposit on recording heads. These undesirable effects often become more pronounced as the amount of dispersant added to the magnetic coating composition is increased. Such an increase of dispersant level is generally necessary when high surface area or metal pigments are employed. Furthermore, the platicization of the binder by the use of high levels of dispersants results in a softening of the media and can lead to wear of the media by the magnetic head. Because of such disadvantages, it is desirable to reduce the amount of phosphate ester dispersant in magnetic coating compositions.

Organosilanes having hydrolyzable groups have been employed in the art to improve dispersion. These materials are believed to form physiochemical bonds with reactive groups on the surface of the magnetic pigment. Moreover, silane coupling agents, which also contain functionality capable of reacting with the binder resin of a magnetic coating composition, may be employed. Thus, for example, Schonafinger et al., in U.S. Pat. No. 4,271,234, disclose the treatment of iron oxide pigment with various silanes including alkyltrimethoxysilane, vinyltrimethoxysilane, gamma- glycidyloxypropyltimethoxysilane, gamma-aminopropyl- triethoxysilane and methacryloxyethyl-trimethoxysilane. When this treated iron oxide is formulated into a magnetic coating, improved dispersion of the pigment, as well as increased durability of the magnetic coating, is reported.

Chlorosilane and alkoxysilane coupling agents are taught by Yamada et al., in U.S. Pat. No. 4,076,890, to modify a magnetic coating mixture. In this case, a large number of silanes is disclosed, and incorporation of the silane into the composition may be by way of treating the magnetic pigment or by direct addition to said composition. The resulting magnetic media are claimed to be abrasion resistant and improved with respect to adhesion between magnetizable layer and support substrate, thereby exhibiting reduced powder dusting from tape edges.

The reaction product of a phosphoric ester with an polyisocyanate compound having at least two isocyanate groups, or an isocyanate compound having a hydrolyzable alkoxysilane, is disclosed by Takeuchi et al. in U.S. Pat. No. 4,501,795. When the reaction product is employes as a dispersant in a magnetic coating composition, good dispersibility of the magnetic powder and excellent durability of the magnetic layer (coating) are said to result.

Kimball, in U.S. Pat. No. 4,719,121, discloses a dispersant for magnetic media which is the reaction product of a phosphate ester and certain silanes. The dispersant is said to form chemcial attachments with reactive groups on the magnetic particles and impart improved magnetic properties when compared with either the silanes alone or with the reaction products of phosphate ester and isocyanante-functional alkoxysilanes.

In a similar vein, U.S. Pat. No. 4,640,790 to Sylvester et al. teaches that the reaction product of a phosphate ester and an alkali siliconate silylakylphosphonate is also a good dispersant for magnetic pigments.

SUMMARY OF THE INVENTION

It has now been found that certain quaternary ammonium salts of alkoxysilanes may be advantageously employed as dispersants for magnetic pigments. The compositions of this invention impart magnetic properties to magnetic media prepared therewith which are comparable to those employing conventional phosphate ester dispersants. However, unlike the phosphate esters, which can migrate to the surface of magnetic media, the dispersants of the present invention can bind to the pigment surface to provide a non-migrating system.

This invention thus relates to a composition comprising:

(A) a quaternary ammonium salt of an alkoxysilane having the formula

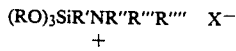

wherein R is an alkyl radical having 1 to 4 carbon atoms, R' is an alkylene group of 1 to 4 carbon atoms, R'' and R''' are each alkyl radicals having 1 to 4 carbon atoms, R'''' is an alkyl radical having 8 to 22 carbon atoms and X is a hydrolyzable group selected from chloride, bromide, iodide, acetate, an alkoxide group RO, in which R has been previously defined, or mixtures thereof; and (B) a magnetic pigment, wherein said composition contains from 1 to 8 parts by weight of (A) for each 100 parts by weight of (B).

This invention further relates to a process for producing a magnetic recording medium comprising:

(i) mixing a magnetic pigment, a binder for said pigment, a dispersant and an inert organic solvent capable of dissolving said binder, to obtain a uniform dispersion thereof;

(ii) coating said dispersion onto a non-magnetic substrate;

(iii) orienting said treated pigment in a magnetic field; and (iv) removing said solvent from the coated substrate, said dispersant being the above described quaternary ammonium salt of an alkoxysilane.

DETAILED DESCRIPTION OF THE INVENTION

The composition of the present invention comprises (A) a dispersant which is a quaternary ammonium salt of an alkoxysilane and (B) a magnetic pigment. This composition may be advantageously combined with a binder for the pigment and an inert solvent for the binder to product a wet magnetic coating composition. The wet magnetic coating composition may, in turn be coated onto a non-magnetic substrate and dried to form a magnetic recording medium of the present invention.

The quaternary ammonium salt of an alkoxysilane (Component A) of the present invention may be represented by the general formula

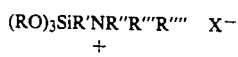

wherein R is an alkyl radical having 1 to 4 carbon atoms, preferably the methyl radical; R' is an alkylene group of 1 to 4 carbon atoms, preferably the trimethylene group; and wherein R'' and R''' are alkyl radicals having 1 to 4 carbon atoms, the methyl radical being again preferred for each. In the above formula, R'''' is an alkyl radical having 8 to 22 carbon atoms and X is a hydrolyzable group selected from chloride, bromide, iodide, acetate, an alkoxide group RO, in which R has its previously defined meaning, or mixtures thereof. It is preferred that R'''' is the n-octadecyl radical and X is selected from chloride, acetate or methoxide, chloride being most preferred.

Specific examples of the quaternary ammonium salt of an alkoxysilane contemplated herein include the structures

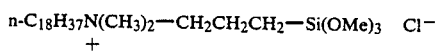

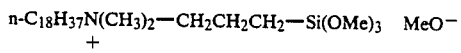

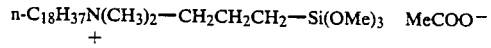

wherein Me hereinafter denotes the methyl radical.

The quaternary ammonium salts of alkoxysilanes of the present invention are well known in the art as antimicrobial agents and some of these compounds are available commercially. For example, U.S. Pat. No. 4,259,103 to Malek et al. discusses the use of such silanes to render the surfaces of certain substrated antimicrobial. Briefly, these materials may be prepared by reacting a chloroalkylalkoxysilane with the corresponding amine to provide a chloride salt. The latter may, in turn, be reacted in an organic solvent environment with sodium methoxide or sodium acetate to replace the anion thereon with methoxide ore acetate, respectively, as sodium chloride precipitates out. The interested reader is directed to numerous publications which disclose these materials, such as Isquith et al., *Applied Microbiology*, p. 859-863, Dec., 1972; Walters et al., *Applied Microbiology*, 25, No. 2, p. 253-256, Feb., 1973; and Abbott et al. in U.S. Pat. Nos. 3,794,736 and 4,406,892, among others.

The magnetic pigment (Component B) of this invention is also well known in the art. It consists essentially of finely divided ferromagnetic oxides or metals. Examples of suitable oxides include such materials as iron oxide (e.g., gamma-ferric oxide), cobalt-modified iron oxide and chromium dioxide. Preferred oxide pigments are selected from the cobalt-modified iron oxides. Metal particles comprise, in majority, a ferromagnetic metal such as iron, cobalt, nickel or alloys thereof. These metal pigments may further contain from about 0.1 to 10% by weight of one or more elements selected from Cd, Zn, Pb, Ca, Mg, Cr, Al, W, P or B. Additional impurities, such as water, oxides and oxidehydroxides, may also be contained in these metal particles. Preferred magnetic metal pigments are selected from the acicular alpha-iron particles. Other magnetic particles which are contemplated as being suitable herein are state-of-the-art magnetic pigments such as barium ferrite and non-polar particles. The interested reader is directed to a review of such pigments by Pollard et al. in *The Symposium on Memory and Advanced Recording Technologies*, San Jose, Calif., May, 1986.

In order to form the compositions of the present invention, Component (A) and Component (B) may be mixed directly during the production of a magnetic coating formulation, as described infra. Preferably, however, the compostions, of the present invention are prepared by treating the magnetic pigment (B) with the quaternary ammonium salt of an alkoxysilane (A). This treatment may be accomplished by simply stirring a mixture of these two components together with a voltatile solvent, or rolling the mixture in a ball mill at ambient temperature, to form a uniform dispersion. After rolling this dispersion for about 10 minutes to 24 hours, the treated pigment is filtered, dried and stored in tightly capped containers. In this procedure, the nature of the volatile solvent is not critical provided it does not adversely influence any of the magnetic properties of the final medium. Thus, for example, when the oxide pigments are employed, suitable solvents include water, toluene, cyclohexanone, methyl ethyl ketone, tetrahydrofuran, methyl isobutyl ketone and butyl acetate. Preferably, water is selected in treating these pigments. However, when metal pigments are to be treated, only organic solvents may be used since the metal particles are known to react with water.

The amount of dispersant (A) required to treat pigment particles (B) depends on the specific particles under consideration and may readily be ascertained by those skilled in the art after a few simple experiments. For the purposes of the present invention, from about 1 to 8 parts by weight of Component (A) are used to treat each 100 by weight of the pigment (i.e., 1–8 parts per hundred, hereinafter designated as pph). In general, however, the minimum amount of the dispersant compatible with desired magnetic properties of the subsequently prepared magnetic medium is employed. It is preferred that about 2 to 4 pph of dispersant (A) is employed in the compositions of the present invention when the pigment is selected from cobalt-modified iron oxide or acicular alpha-iron particles.

The present invention also relates to a process for producing a magnetic recording medium which employs the above described quaternary ammonium salt of an alkoxysilane (Component A) as a dispersant for magnetic pigment particles. According to methods well known in the art, a wet magnetic coating composition is first prepared by simultaneously, or sequentially, mixing the quaternary ammonium salt of an alkoxysilane (Component A), pigment (Component B), a binder for the pigment, an inert organic solvent for the binder and, optionally, various adjuvants. As mentioned above, it is preferred to first treat the pigment with the quaternary ammonium salt of an alkoxysilane and mix the treated pigment with the binder, solvent and adjuvants. A mixer such as a ball mill, two-roll mill, continuous media mill, sand mill, colloid mill or homogenizer may be utilized to thoroughly mix the ingredients till a good dispersion is attained.

The binder of the present invention may be any suitable resin capable of binding the magnetic metal particles to each other as well as to a non-magnetic substrate, described infra. These materials are also well known in the art, examples being polyurethane, poly(vinyl chloride), polyester, poly(vinylidene chloride), epoxy resin, poly(acrylonitrile), polyacrylic esters, polymethacrylic esters, polyamide, poly(vinyl acetal), poly(vinyl butyral), poly(vinyl pyridine), polycarboate, polysulfone, phenol formaldehyde resin and melamine formaldehyde resi. A preferred binder is polyurethane. Typically, the binder content of the magnetic coating composition is between about 2 and 30 parts on a weight basis per 100 parts of the treated pigment particles.

The inert organic solvent should be a good solvent for the binder and may be selected from the organic solvents described in connection with the pigment treatment procedure, supra. In practice, the binder is generally added in the form of a solution in one or more of these solvents.

In addition to the treated pigment, binder and inert organic solvent, the magnetic coating compositions of this invention typically contain various adjuvants known in the art to improve the final characteristics of the magnetic recording medium. Suitable adjuvants include additional dispersants; modifying resins, such as vinyl resins, nitrocellulose and high molecular weight epoxy compounds; lubricants; corrosion inhibitors; antistatic agents; and polishing agents. Generally, the magnetic coating composition may contain from about 2 to about 10 parts by weight of such adjuvants, based on 100 parts of the pigment particles.

In regard to the above mentioned adjuvants, it is particularly preferred that at least one of the conventional phosphate ester dispersants be included in the preparation of the magnetic coating composition. These supplementary dispersants may be selected from those described in U.S. Pat. No. 4,640,790 to Sylvester et al., cited supra and hereby incorporated by reference. The phosphate esters most useful are those having the formula

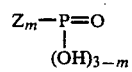

wherein Z is selected from at least one group having the formula

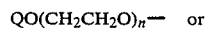

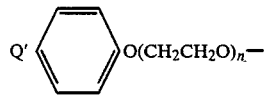

in which Q and Q' denote alkyl radicals, each having from 8 to 12 carbon atoms, and n is 5 to 40. The value of m in the above formula is between 1 and 2, a blend of mono- and di- esters wherein the average value of m is about 1.5 being preferred. The phosphate esters are well known in the art and many of them are commercially available. Particularly preferred phosphate esters are marketed by the GAF Corporation (Wayne, N.J.) under the tradename "GAFAC."

A magnetic recording medium is prepared by applying the solvent-containing magnetic coating composition, described above, to a non-magnetic substrate, orienting the magnetic metal particles in a magnetic field, and drying the coating. Suitable non-magnetic substrates include polymers, such as polyethylene terephthalate, polyethylene, polypropylene, cellulose triacetate, polycarbonate and polyimides. Alternatively, the substrate may be a non-magnetic metal, such as aluminum, copper, tin, zinc, magnesium and alloys thereof. The form of the substrate is not critical, films, tapes, sheets, discs and drums being within the scope of this invention. Application of the coating to the substrate may be accomplished by any of the usual methods known in the art, such as blade coating, reverse roll coating, and gravure coating. The removal of solvents, or drying, is preferably carried out at a temperature of about 60° to 85° C. Dry coating thickness obtained can be varied according to the particular application but generally it is kept between 0.75 and 20 micrometers.

EXAMPLES

The following examples are presented to further illustrate the compositions of the present invention but are not to be construed as limiting the invention, which is delineated in the appended claims. All parts and percentages in the examples are on a weight basis unless indicated to the contrary. The abbreviation "pph" as used herein refers to the number of parts of a given component per hundred parts of magnetic pigment.

Dispersants According to the Present Invention

Dispersant (I)

A 42 weight percent methanol solution of a quaternary ammonium salt of an alkoxysilane having the formula $$\text{n-}C_{18}H_{37}\overset{+}{N}(CH_3)_2-CH_2CH_2CH_2-Si(OMe)_3 \quad Cl^- \quad \text{(I)}$$

wherein Me herein denotes the methyl radical.

Dispersant (II)

Same as (I), wherein a portion of the chloride radical was replaced with methoxide by reacting 23.71 grams of the above solution of (I) with 1.14 grams of NaOCH$_3$ at room temperature for about 48 hours. The byproduct salt (NaCl) was allowed to settle out before this dispersant was employed in the preparation of magnetic media (see below).

Dispersant (III)

Same as (I), wherein a portion of the chloride radical was replaced with acetate by reactig an equimolar quantity (based on solids) of the above solution of (I) and sodium acetate at room temperature for about 24 hours. Again the salt was separated from the solution before the latter was employed in the preparation of magnetic media.

Comparative Dispersants

Dispersant IV

A 12.2 gram (0.43 mole) quantity of isotearic acid and 2.3 grams (0.43 mole) of sodium methoxide were reacted in 50 grams of methanol of give a clear solution. To this was added 50 grams of DISPERSANT (I). Sodium chloride precipitated out slowly and the mixture was allowed to stand overnight.

Dispersant V

Isobutyltrimethoxysilane (V)

Dispersant VI

A partial hydrolyzate of octadecyltrimethoxysilane was prepared by dissolving 2.0 grams of n-octadecyltrimethoxysilane in 17.5 grams of the methyl ether of propylene glycol. To this mixture was added 1.0 gram of water and 2 drops of glacial acetic acid. The hydrolyzate formed by this procedure was allowed to stand for about 30 minutes before being employed as a dispersant.

Dispersant VII

N-(beta-aminoethyl)-gamma-aminopropyltrimethoxysilane (VIII)

Dispersant VIII

A 40% by weight solution in methanol of N-beta-(N-vinylbenzylamino)ethyl-gamma-aminopropyltrimethoxysilane monohydrogen chloride, having the structural formula

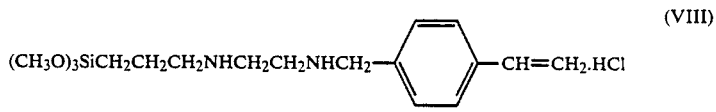

(VIII)

Dispersant IX

A 50% water dispersion of a sodium salt of

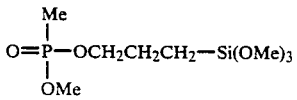

(IX)

Dispersant X

Gamma-glycidoxypropyltrimethoxysilane (X)

Dispersant XI

Methyltrimethoxysilane (XI)

Dispersant XII

Vinyltrimethoxysilane (XII)

Dispersant XIII

Phenyltrimethoxysilane (XIII)

Dispersant XIV

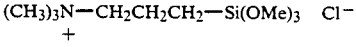

(XIV)

Dispersant XV

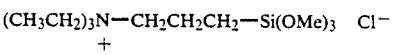

(XV)

EXAMPLES 1–47

Magnetic Media Preparation

The dispersants of the present invention as well as the comparative dispersants described above were employed in the preparation of magnetic media as follows:

1. Treatment of Magnetic Pigment

First, a magnetic pigment was treated with the above dispersant. A one quart wide-mouth polyethylene jar was half filled with ¼ inch diameter stainless steel balls. Fifty grams of PFERRICO 5090 pigment, 125 grams of water and the appropriate amount of dispersant were added to the jar. PFERRICO 5090 (Pfizer Pigments, Inc., New York, N.Y.) is described as a cobalt-modified iron oxide for high density recording media having a surface area of 41.9 square meters per gram, average dimensions of 0.04 micron (width) by 0.2 micron (length), average aspect ratio is 5.5, ph of 8.8 and coercivity of 935 Oe. After rolling this mixture at room temperature for about 24 hours, the resulting dispersion was filtered through a No. 40 WHATMAN filter paper and the treated pigment dried to constant weight at 125° C. The dispersant used to treat the pigment, and the amount of dispersant applied thereto, are indicated in the second column of Table 1, below.

2. Slush Grind

A 5.5 oz. stainless steel container filled with approximately 250 grams of stainless steel balls having a diameter of about ⅛ inch was charged with about 15 grams of one of the above treated pigments. There was then added 1.8 grams of a 25% solution of GAFAC RE-610 dispersant in cyclohexanone. GAFAC RE-610 (GAF Corp., Wayne, N.J.) is described as a blend of phosphate mono- and di-esters of the ethylene oxide-adduct type. GAFAC RE-610 is widely used commercial dispersant for magnetic pigment having a maximum moisture content of 0.5%, a specific gravity of 1.10 to 1.12, an acid number of 62-72 and a pH <2.5 (10% solution at 25° C.).

Next, there was added 12.5 grams of a 10% solution of ESTANE 5701-F1 binder in cyclohexanone. ESTANE 5701-F1 (B. F. Goodrich Company, Cleveland, Ohio) is described as a polyester-based polyurethane resin. An additional 37.5 grams of cyclohexanone was then added so as to reduce the total solids content to 25%. The container was closed and the contents milled by vibrating the container on a standard paint shaker for one hour at room temperature.

3. Let-Down

An additional 0.6 gram of the GAFAC RE-610 solution and 19.0 grams of the ESTANE 5701-F1 solution were added to the above milled dispersion to provide a final treated pigment content of 80% (based on total solids) and a total GAFAC RE-610 content of 4 pph. An additional mill time of 15 minutes resulted in a magnetic coating composition.

The above described slush grind and let-down procedures were also used to prepare control formulations wherein the pigment particles were not treated and wherein the total GAFAC RE-610 content was 4 and 8 pph, respectively, as indicated in the third column of Table 1.

4. Tape Production

Each magnetic coating composition was coated onto 1.42 mil thick video-grade poly(ethylene teraphthalate) film using a draw-down coating bar having a 1 mil gap at a coating speed of approximately one foot per second. Simultaneous to the coating procedure, the still wet magnetic coating was subjected to orientation by a 2,000 Oersted one-way magnet in a direction parallel to the draw axis. The coated film was allowed to dry at room temperature for at least one hour, whereupon two 20 inch-long by ⅜0 inch-wide tape sections were cut longitudinally (i.e., along the draw direction) from said film. The tape sections were folded in half (lengthwise) and inserted into a 10 mm diameter glass sample tube for magnetic property evaluation as follows.

An LDJ B/H meter, model number 7500A (LDJ, Troy, Mich), was used to determine the coercivity ($H_c$), squareness ratio (SR) and switching field distribution (SFD) at 22° C. using a frequency of 60 Hz and a longitudinally applied field of 3,000 Oe. At least 5 reading were taken for each sample and averaged to obtain the reported results.

TABLE 1

Magnetic Properties of Tapes Prepared with PFERRICO 5090 Iron Oxide Pigment

| | DISPERSANT/ Amount in Pigment (pph, solids basis) | GAFAC RE-610 (pph solids basis) | MAGNETIC PROPERTIES OF MEDIA | | |
|---|---|---|---|---|---|
| | | | $H_c$ (Oersteds) | SR | SFD |
| Example | | | | | |
| 1 | (I)/2 pph | 4 | 922 | 0.73 | 0.65 |
| 2 | (I)/2 | 4 | 913 | 0.72 | 0.68 |
| 3 | (I)/2 | 4 | 928 | 0.71 | 0.67 |
| 4 | (I)/2.5 | 4 | 941 | 0.74 | 0.65 |
| 5 | (I)/3 | 4 | 943 | 0.75 | 0.63 |
| 6 | (I)/3.5 | 4 | 941 | 0.75 | 0.62 |
| 7 | (I)/4 | 4 | 944 | 0.77 | 0.62 |
| 8 | (I)/4 | 4 | 955 | 0.77 | 0.63 |
| 9 | (I)/6 | 4 | 945 | 0.76 | 0.64 |
| 10 | (I)/6 | 4 | 953 | 0.77 | 0.65 |
| 11 | (I)/8 | 4 | 945 | 0.76 | 0.65 |
| 12 | (I)/8 | 4 | 945 | 0.75 | 0.67 |
| 13 | (I)/10 | 4 | 944 | 0.76 | 0.66 |
| 14 | (I)/10 | 4 | 949 | 0.74 | 0.68 |
| 15 | (II)/3 | 4 | 926 | 0.74 | 0.68 |
| 16 | (III)/3 | 4 | 917 | 0.72 | 0.66 |
| Comparative Example | | | | | |
| 17 | (IV)/2 pph* | 4 | 896 | 0.69 | 0.72 |
| 18 | (V)/7.5 | 4 | 906 | 0.73 | 0.67 |
| 19 | (V)/3 | 4 | 855 | 0.67 | 0.78 |
| 20 | (VI)/3 | 4 | 891 | 0.69 | 0.73 |
| 21 | (VII)/7.5 | 4 | 911 | 0.69 | 0.72 |
| 22 | (VII)/3 | 4 | 896 | 0.69 | 0.73 |
| 23 | (VIII)/7.5 | 4 | 912 | 0.72 | 0.70 |
| 24 | (VIII)/3 | 4 | 913 | 0.70 | 0.70 |
| 25 | (IX)/7.5 | 4 | 870 | 0.64 | 0.81 |
| 26 | (X)/7.5 | 4 | 867 | 0.66 | 0.75 |
| 27 | (X)/3 | 4 | 881 | 0.69 | 0.72 |
| 28 | (XI)/7.5 | 4 | 863 | 0.65 | 0.80 |
| 29 | (XI)/3 | 4 | 881 | 0.70 | 0.69 |
| 30 | (XII)/7.5 | 4 | 866 | 0.68 | 0.75 |

TABLE 1-continued

Magnetic Properties of Tapes Prepared with PFERRICO 5090 Iron Oxide Pigment

| | DISPERSANT/ Amount in Pigment (pph, solids basis) | GAFAC RE-610 (pph solids basis) | MAGNETIC PROPERTIES OF MEDIA | | |
|---|---|---|---|---|---|
| | | | $H_c$ (Oersteds) | SR | SFD |
| 31 | (XIII)/7.5 | 4 | 890 | 0.71 | 0.69 |
| 32 | (XIV)/3 | 4 | 862 | 0.66 | 0.77 |
| 33 | (XV)/3 | 4 | 866 | 0.66 | 0.75 |
| 34 | None (Control) | 4 | 870 | 0.64 | 0.80 |
| 35 | " | 4 | 865 | 0.63 | 0.82 |
| 46 | " | 8 | 921 | 0.75 | 0.64 |
| 47 | " | 8 | 921 | 0.74 | 0.64 |

*Pigment treated in methanol instead of water.

It can be seen from Table 1 that the dispersants of the present invention allow the reduction of the level of GAFAC RE-610 dispersant to 4 pph while preserving the desirable magnetic properties of media prepared with 8 pph of this migrating dispersant (Compartive Examples 46 and 47). It will be noted that, while some of the comparative dispersants may provide magnetic properties (particularly SR) which are comparable to the dispersants of this invention, such results are generally only achieved at considerably higher levels and are, therefore, less desirable even if one overlooks their facile migration in the recording media.

EXAMPLES 48-53

Procedures similar to those above were followed in the preparation of magnetic media based on a metal pigment, PFERROMET 1500. PFERROMET 1500 (Pfizer Pigments, Inc., New York, N.Y) is described as an acicular iron particle having a carbon content of 1%, a maximum moisture content of 1.5% and surface area of 45-55 m2/g. DISPERSANT (I) was used to treat this pigment by rolling 50 grams of the pigment (as received) with 200 grams of toluene and the amount of dispersant indicated in Table 2. After rolling at room temperature for about 16 hours the dispersion was poured into a baking dish and the solvent removed by evaporation in an air hood for about 24 hours. This treated pigment was vacuum dried to constant weight at 45° C.

In Example 48, the stainless steel container was charged with 41.4 grams of cyclohexanone, 6.2 grams of the 10% ESTANE 5701-F1 solution and 2.4 grams of the 25% GAFAC RE-610 solution. Fifteen 15 grams of the treated pigment and 250 grams of the stainless steel balls were then added to the container and the contents milled for 4 hours, as in the above slush grind procedure. In these examples, the dispersion resulting from the slush grind was used directly to produce magnetic tape. The magnetic properties of the finished tapes are presented in Table 2, wherein the applied field during magnetic testing was increased to 4,500 Oe.

The above procedures were repeated wherein the GAFAC RE-610 was omitted from the slush grind composition, magnetic properties of these tapes being presented as Examples 49 and 50 in Table 2.

These procedures were again repeated wherein the PFERROMET 1500 was not treated with DISPERSANT (I) but only GAFAC RE-610 was employed as a dispersant in the slush grind. The results of magnetic testing of these tapes are also given in Table 2. (Comparative Examples 51-53).

TABLE 2

Magnetic Properties of Tapes Prepared with PFERROMET 1500 Metal Pigment

| | DISPERSANT (I) In Pigment (pph, solids basis) | GAFAC RE-610 (pph, solids basis) | MAGNETIC PROPERTIES OF MEDIA | | |
|---|---|---|---|---|---|
| | | | $H_c$ (Oersteds) | SR | SFD |
| Example | | | | | |
| 48 | 4 | 4 | 1595 | 0.77 | 0.58 |
| 49 | 4 | 0 | 1579 | 0.73 | 0.63 |
| 50 | 8 | 0 | 1592 | 0.79 | 0.58 |
| (Comparative) Example | | | | | |
| 51 | 0 | 4 | 1604 | 0.69 | 0.65 |
| 52 | 0 | 8 | 1609 | 0.78 | 0.57 |
| 53 | 0 | 8 | 1597 | 0.74 | 0.58 |

In addition to demonstrating the use of a dispersant of the present invention in conjunction with a metal magnetic pigment, the above examples illustrate the use of this quaternary ammonium salt of an alkoxysilane as the sole dispersant in the preparation of magnetic media. It was further observed that the magnetic tape of Example 48 showed a higher 60° gloss value than tapes employing the other compositions. Since 60° gloss is considered to be directly related to the quality of dispersion, the latter observation illustrates the particular advantage of using the dispersants of this invention in combination with phosphate ester dispersants such as GAFAC RE-610.

That which is claimed is:
1. A composition comprising:
(A) from about 1 to 8 parts by weight of a quaternary ammonium salt of an alkoxysilane having the formula $$\text{n-C}_{18}\text{H}_{37}\overset{+}{\text{N}}(\text{CH}_3)_2\text{—CH}_2\text{CH}_2\text{CH}_2\text{—Si(OMe)}_3 \quad \text{X}^-$$

wherein Me denotes the methyl radical and X is a hydrolyzable group selected from the group consisting of chloride, bromide, iodide, acetate, and methoxide;

(B) 100 parts by weight of a magnetic pigment; and (C) a phosphate ester dispersant.

* * * * *